US012214876B2

(12) United States Patent
Barnett et al.

(10) Patent No.: US 12,214,876 B2
(45) Date of Patent: Feb. 4, 2025

(54) COVER PANEL

(71) Applicant: AIRBUS OPERATIONS LIMITED, Bristol (GB)

(72) Inventors: Thomas Barnett, Bristol (GB); Lee Proudler, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 18/029,071

(22) PCT Filed: Aug. 11, 2021

(86) PCT No.: PCT/EP2021/072355
§ 371 (c)(1),
(2) Date: Mar. 28, 2023

(87) PCT Pub. No.: WO2022/069101
PCT Pub. Date: Apr. 7, 2022

(65) Prior Publication Data
US 2023/0373610 A1    Nov. 23, 2023

(30) Foreign Application Priority Data
Sep. 29, 2020   (GB) ...................... 2015364

(51) Int. Cl.
*B64C 3/26*       (2006.01)
*B64C 1/06*       (2006.01)
(Continued)

(52) U.S. Cl.
CPC ............... *B64C 3/26* (2013.01); *B64C 1/069* (2013.01); *B64C 3/20* (2013.01); *B64C 23/069* (2017.05)

(58) Field of Classification Search
CPC .......... B64C 3/26; B64C 3/20; B64C 23/069; B64C 1/069; B64C 2001/0072; B64C 1/12; Y02T 50/10; Y02T 50/40
See application file for complete search history.

(56) References Cited

U.S. PATENT DOCUMENTS

| 1,613,602 A * | 1/1927 | Birmingham ............. B64C 3/00 |
| | | 244/129.4 |
| 2008/0115887 A1* | 5/2008 | Kaye ..................... B29C 70/545 |
| | | 156/307.1 |

(Continued)

FOREIGN PATENT DOCUMENTS

| CA | 2862713 A1 * | 7/2013 | ............... B64C 1/12 |
| CA | 2808770 A1 * | 11/2013 | ........... B29C 65/483 |

(Continued)

OTHER PUBLICATIONS

Thawre et al. (doc. .Effect of ply-drop on fatigue life of a carbon fiber composite under a fighter aircraft spectrum load sequence (Year: 2016).*

(Continued)

*Primary Examiner* — Assres H Woldemaryam
(74) *Attorney, Agent, or Firm* — Nixon & Vanderhye P.C.

(57) ABSTRACT

A cover panel for an aircraft including: a first region, a second region for forming an overlap with a second panel, and a ramp, wherein at least a portion of the ramp is between the first and second regions, wherein the ramp includes a tapered region such that a width of the ramp tapers towards a free-edge of the first region, and wherein the free-edge is configured to form a butt-joint with the second panel.

17 Claims, 13 Drawing Sheets

(51) Int. Cl.
   *B64C 3/20*      (2006.01)
   *B64C 23/06*     (2006.01)

(56)          References Cited

U.S. PATENT DOCUMENTS

2009/0148301  A1*   6/2009   Leahy ................... B64C 27/473
                                                        416/223 R
2011/0095133  A1*   4/2011   Stewart .................... B64C 3/28
                                                           244/123.1
2013/0264421  A1*  10/2013   Firko ...................... B64C 1/064
                                                            428/603
2014/0346281  A1   11/2014   Gratzer
2018/0155006  A1*   6/2018   Arana Hidalgo ......... B64C 1/26
2019/0329873  A1*  10/2019   Proudler ................ B64C 3/185
2021/0114711  A1*   4/2021   Barnett ................ B29C 70/222

FOREIGN PATENT DOCUMENTS

EP           3 330 174        6/2018
WO      WO-2009004362 A2 *    1/2009   ............ B29C 70/30
WO      WO-2009118548 A2 *   10/2009   ............. B64C 1/12
WO         2013/108013        7/2013
WO         2017/027087        2/2017

OTHER PUBLICATIONS

International Search Report and Written Opinion of the ISA dated Nov. 23, 2021, for PCT/EP2021/072355, 13 pages.

\* cited by examiner

Plan View

Detail B

COVER PANEL

RELATED APPLICATIONS

This application is the U.S. national phase of International Application PCT/EP2021/072355, filed Aug. 11, 2021, which designated the U.S. and claims priority to United Kingdom patent application GB 2015364.9, filed Sep. 29, 2020, the entire contents of each of which are hereby incorporated by reference.

FIELD OF THE INVENTION

The present invention relates to a cover panel, and a method of manufacturing a cover panel.

BACKGROUND OF THE INVENTION

Aircraft are continually being developed, with ongoing improvements and modifications made to existing aircraft. However, in order to meet certification requirements and for other reasons, some features on aircraft are required to remain relatively unchanged. This can create difficulties when implementing modifications to an aircraft design, as the modifications have to accommodate existing features of the aircraft that cannot be changed or modified.

SUMMARY OF THE INVENTION

A first aspect of the invention provides a cover panel for an aircraft, comprising: a first region, a second region for forming an overlap with a second panel, and a ramp, wherein at least a portion of the ramp is between the first and second regions, wherein the ramp includes a tapered region such that a width of the ramp tapers towards a free-edge of the first region, and wherein the free-edge is configured to form a butt-joint with the second panel.

A second aspect of the invention provides a method of manufacturing a cover panel for an aircraft wing comprising: forming a ramp between a first region and a second region of a panel, wherein the ramp extends in a first direction, cutting through the ramp at an oblique angle to the first direction to form a tapered region of the ramp and a free-edge of the first region, wherein a width of the ramp between the first and second regions tapers towards the free-edge of the first region.

A third aspect of the invention provides an assembly comprising a cover panel according to the first aspect, and a second panel forming an overlap with the second region of the cover panel.

A further aspect of the invention provides an aircraft wing tip device comprising the cover panel of the first aspect and/or the assembly of the third aspect.

Optionally, wherein the tapered region extends in a direction that is angled with respect to a portion of the ramp adjacent to the tapered region.

Optionally, wherein the thickness of the first region is greater than the thickness of the second region.

Optionally, wherein a side of the panel is substantially planar.

Optionally, wherein the cover panel comprises composite material, preferably carbon fibre reinforced polymer.

Optionally, wherein the ramp includes one or more ply drops, preferably wherein the ramp is formed entirely by ply drops.

Optionally, wherein the cover panel is a laminate comprising a plurality of dropped plies across the first region, and the location of the dropped plies coincides with the tapered region such that a height of the tapered region decreases towards the free-edge.

Optionally, wherein the ramp includes a tapered region, a first portion and a second portion each between the first and second regions, the first portion extending in a direction angled with respect to the second portion.

Optionally, wherein the first portion extends in a direction substantially perpendicular to the second portion.

Optionally, wherein the second panel has a substantially straight edge that extends across a portion of the second region and abuts the free-edge of the first region.

Optionally, wherein the cover panel is an aircraft wing tip cover panel and the second panel is a removable aircraft wing tip cover panel.

Optionally, wherein at least a portion of the ramp and free-edge extend in a generally chordwise direction.

Optionally, wherein the free-edge is aft of the ramp and is configured to extend towards a trailing edge of a wing tip device.

Optionally, wherein the first portion of the ramp extends in a generally chordwise direction and the second portion of the ramp extends in a generally spanwise direction.

Optionally, wherein the second portion of the ramp extends inboard towards an inboard end of a wing tip device.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
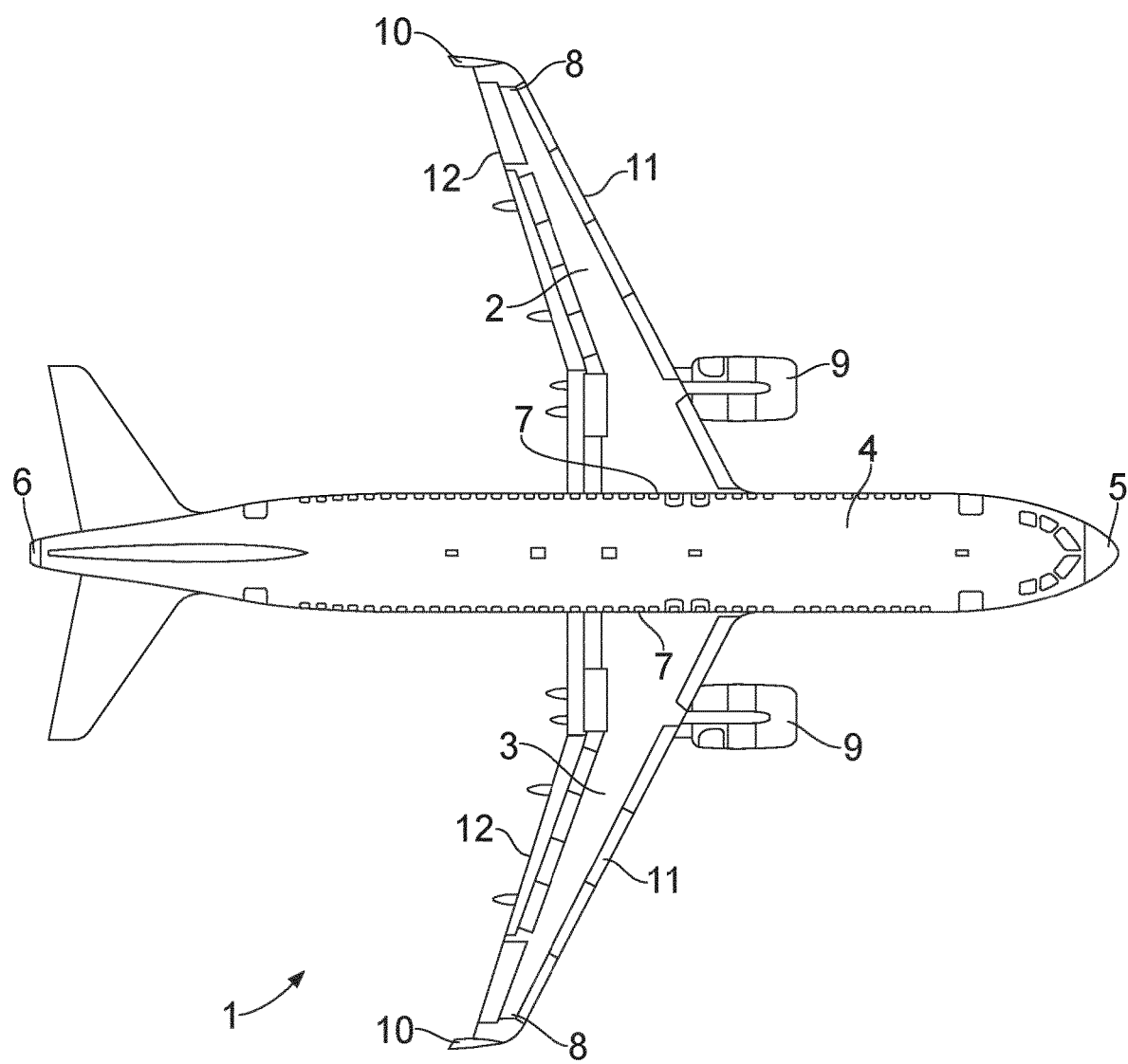
FIG. 1 shows a plan view of an aircraft.

FIG. 1 shows an aircraft 1 with port and starboard fixed wings 2, 3, and a fuselage 4 with a nose 5 and a tail 6. The aircraft 1 is a typical jet passenger transonic transport aircraft but the invention is applicable to a wide variety of fixed wing aircraft types, including commercial, military, passenger, cargo, jet, propeller, general aviation, etc. with any number of engines 9 attached to the wings or fuselage.

Each wing 2, 3 has a cantilevered structure with a length extending in a spanwise direction from a wing root 7 to a wing tip 8, the wing root 7 being joined to the fuselage 4 and the wing tip 8 attached to a wing tip device 10. The wings 2, 3 are similar in construction so only the port wing 2 will be described in detail with reference to the following Figures.

In the following description, the terms "front" or "forward" refer to components towards a leading edge 11 of the wing 2 or leading edge 11a of the wing tip device 10, and the terms "rear" or "aft" refer to components towards a trailing edge 12 of the wing 2 or trailing edge 12a of the wing tip device 10. The position of features may be construed relative to other features, for example a forward component may be disposed on a forward side of another component, but towards the rear of the vehicle. Similarly, the terms "upper" and "lower" refer to the position of features relative to other features and in accordance with a normal orientation of the aircraft 1. Similarly, the terms "inboard" and "outboard" refer to the relative positions of features in the spanwise direction of the wing 2 or wing tip device 10. That is, for example, an inboard component is closer to the root 7 of the wing 2 than an outboard component, and an outboard component is closer to the tip 8 of the wing 2 or wing tip device 10 than an inboard component.

Figure 2:
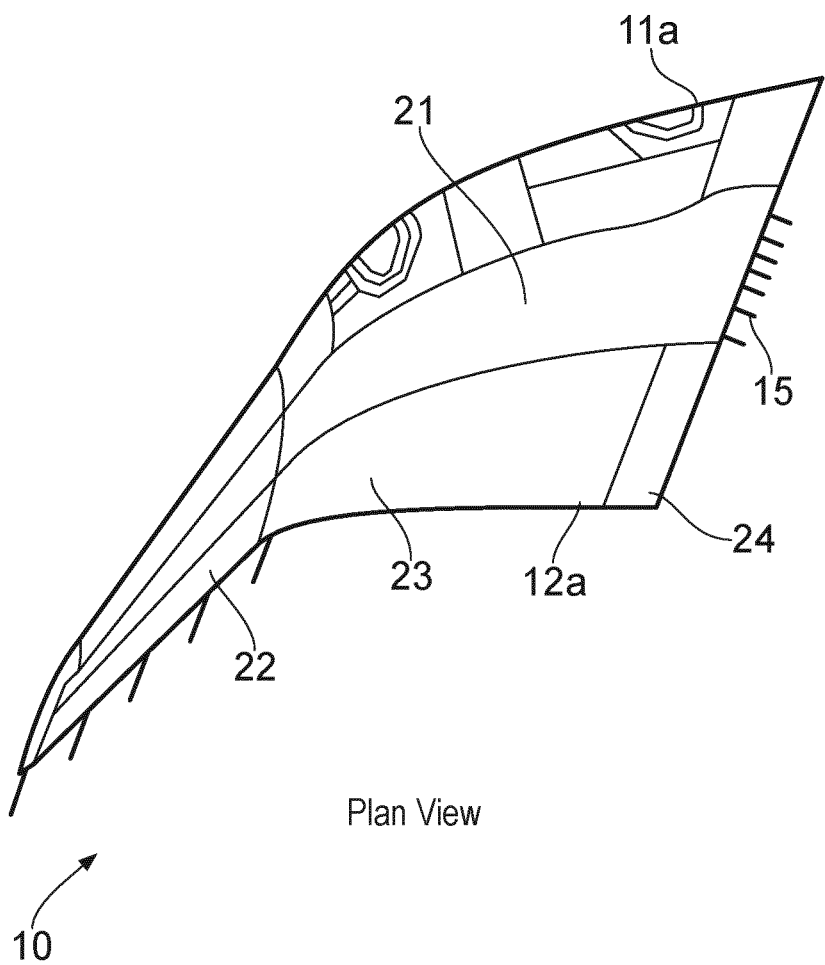
FIG. 2 shows an existing wing tip device for an aircraft.

FIG. 2 shows an upper aerodynamic surface of an existing wing tip device 10. The wing tip device 10 includes a main cover panel 21 between spars (not shown), an outboard cover panel 22, a trailing edge cover panel 23, and a trailing edge access panel 24. The wing tip device 10 also includes a number of further cover panels forming a complete outer aerodynamic surface of the wing tip device 10 that will not be discussed further.

The trailing edge access panel 24 is a removable panel that provides access to systems and devices within the wing tip device 10, in particular access to the wing tip joint 15 for installation of the wing tip device 10 to the wing 2. The trailing edge access panel 24 is a rectangular panel, extending in a generally chordwise direction from the main cover panel 21 to a trailing edge 12a of the wing tip device 10.

Figure 3:
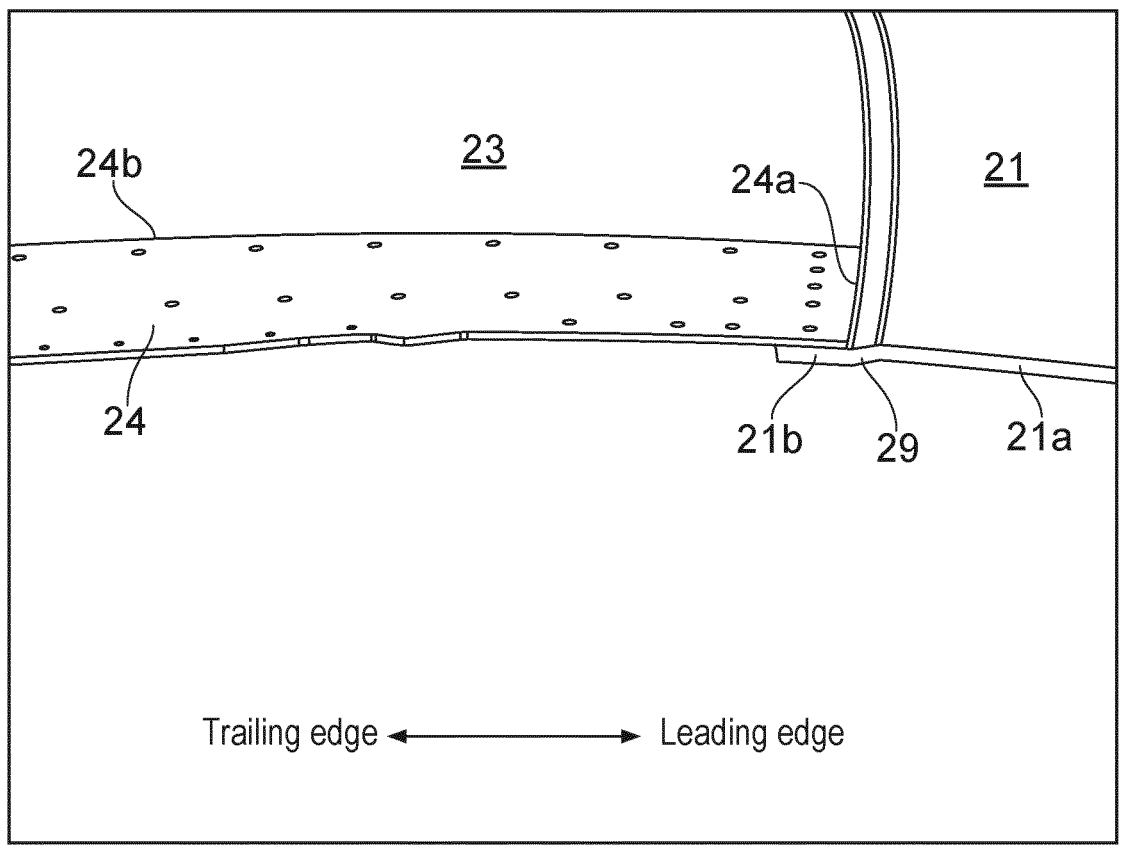
FIG. 3 shows a trailing edge access panel overlapping a joggled portion of a main cover panel of the wing tip device of FIG. 2.

As shown in FIG. 3, the main cover panel 21 includes a first region 21a and a second region 21b with a joggle 29 between the first and second regions 21a, 21b. The second region 21b is adjacent the trailing edge of the main cover panel 21 and supports a forward portion of each of the trailing edge cover panel 23 and trailing edge access panel 24.

A joggle is a step formed between an upper region (in this case—first region 21a) and a lower region (in this case—second region 21b) of a panel 21, wherein both the upper and lower surfaces of the panel 21 have a ramp at the same location to form a generally S-shaped region that smoothly ramps between the upper and lower regions. The thickness of the panel will typically be constant across the width of the joggle. In a composite panel at least some of the plies and/or fibres will be continuous through the joggle region and extend into both the upper and lower regions.

The joggle 29 provides a strong structural joint for the attachment of the trailing edge cover panel 23 and trailing edge access panel 24, whilst minimising the impact of the joint on the airflow over the outer aerodynamic surface of the wing tip device 10 by minimising or eliminating any discontinuities in the aerodynamic surface that would disrupt the airflow.

Figure 4A:
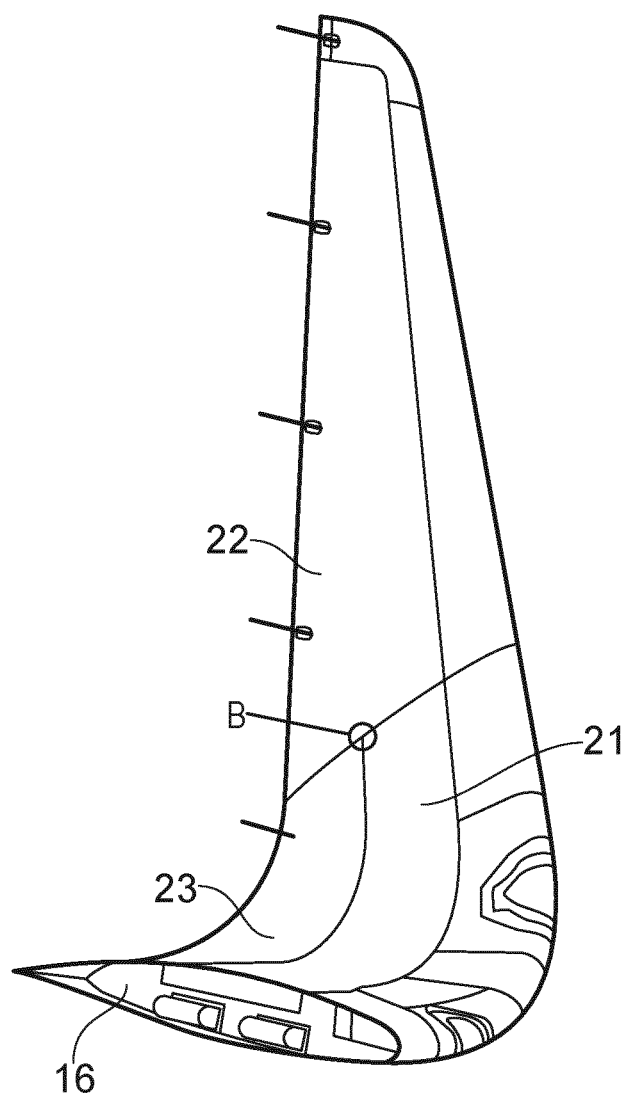
FIG. 4A shows a perspective view of the existing wing tip device.

The joggle 29 extends along the spanwise extent of the main cover panel 21, from an inboard end 16 of the wing tip device 10 towards an inboard edge of the outboard cover panel 22 shown in FIG. 4A.

Figure 4B:
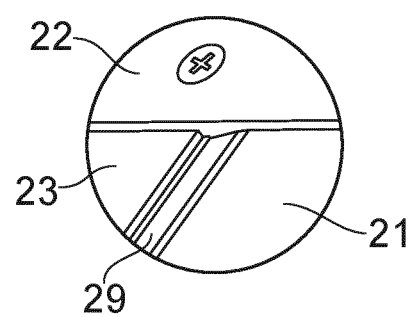
FIG. 4B shows the termination of the joggle at the outboard cover panel of the existing wing tip device.

The juncture between the main cover panel 21, outboard cover panel 22, and trailing edge cover panel 23 is shown in detail in FIG. 4B. The joggle 29 terminates at the butt-joint between the main cover panel 21 and the outboard cover panel 22, with the main cover panel 21, outboard cover panel 22, and trailing edge cover panel 23 each supported by an outboard chordwise rib (not shown) at the juncture location such that the butt-joint is supported.

A butt-joint is a joint formed by the positioning of two edges adjacent to each other, the edges will abut and typically the edges will be parallel to each other.

A step between upper and lower regions, thereby providing a shelf to support a panel, can provide a significant weight advantage over a butt-joint, as well as potentially reducing fastener count and improving aerodynamic streamlining. However, this typically results in a thickening of the joint at the location of the joggle in comparison to a butt-joint.

Figure 5A:
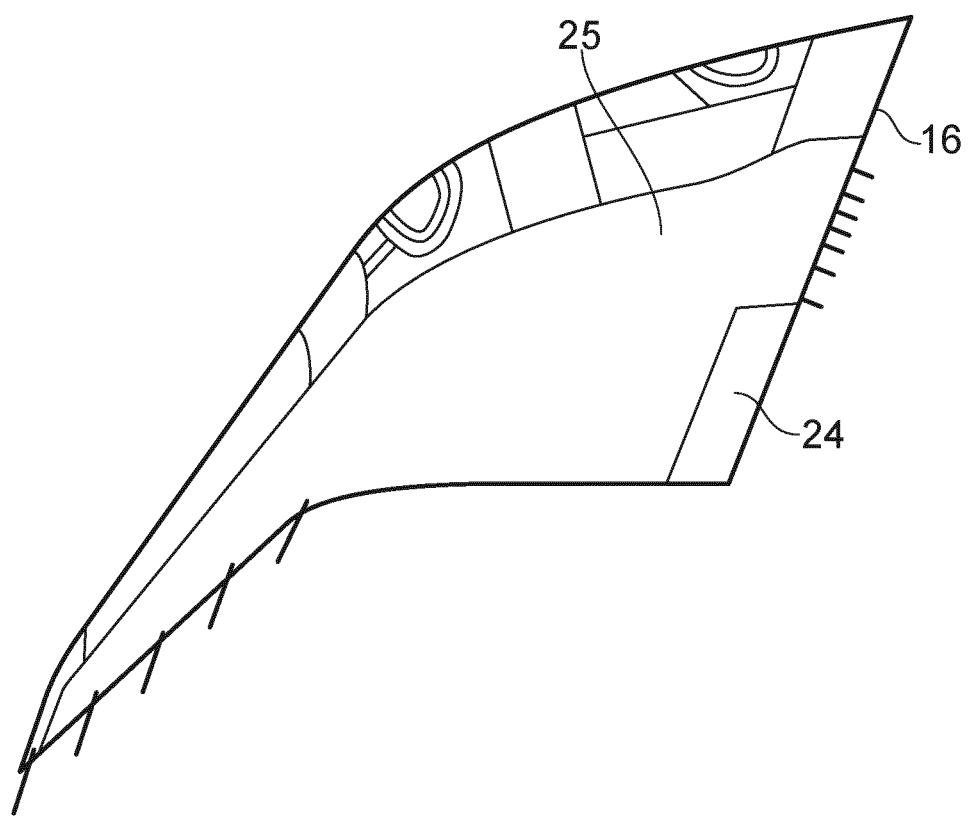
FIG. 5A shows a plan view of the upper surface of a wing tip device according to a first example of the invention.

FIG. 5A shows a cover panel 25 according to a first example of the invention, in which the main cover panel, outboard cover panel, and trailing edge cover panel are formed as a single-piece composite cover panel 25, in particular a single-piece carbon fibre composite cover panel 25. There are a number of advantages associated with forming the cover panels as a single-piece cover panel 25, including improved aerodynamics and weight savings.

A consequence of integrating the main cover panel, outboard cover panel, and trailing edge cover panel into a single-piece cover panel 25 is that there is no easy place at which to terminate the joggle 29, as the joggle 29 is unable to extend towards the outboard chordwise rib discussed above in relation to FIG. 4B that supports the butt-joint between the main cover panel 21 and the outboard cover panel 22.

Figure 5B:
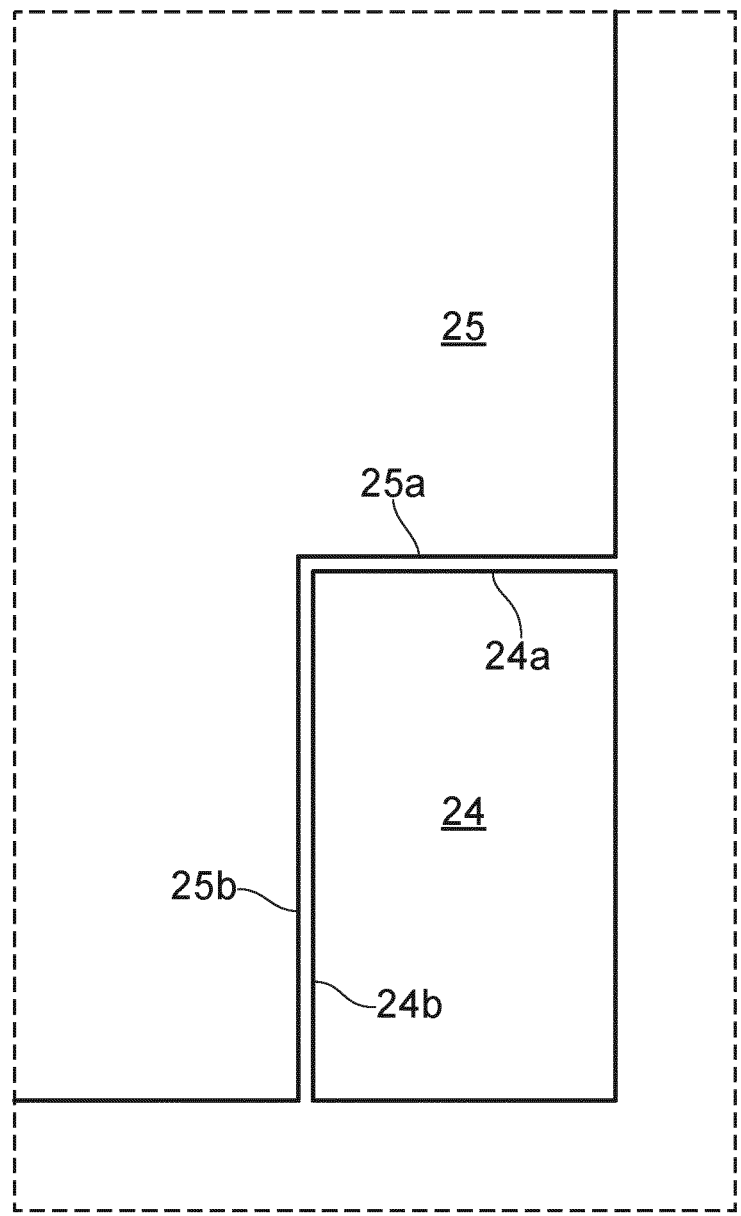
FIG. 5B shows a schematic view of the joint between a trailing edge access panel and a single-piece cover panel.

Furthermore, the trailing edge access panel 24 is a standard sized component to which interchangeability requirements mean that modifications to the design and location of the trailing edge access panel 24 are to be avoided. The trailing edge access panel 24 is therefore a generally rectangular panel, as described in above in relation to FIG. 3, with a spanwise edge 24a arranged to extend in a substantially spanwise direction of the wing tip device 10, and a chordwise edge 24b arranged to extend in a substantially chordwise direction of the wing tip device 10, as shown in FIG. 5B. Each of the spanwise and chordwise edges 24a, 24b of the trailing edge access panel 24 are arranged to extend up to corresponding spanwise and chordwise edges 25a, 25b of the single-piece cover panel 25. The trailing edge of the trailing edge access panel 24 and single-piece cover panel 25 extend to the trailing edge 12a of the wing tip device 10.

The lack of an existing support structure to support the termination of a joggle provides limited options.

A joggle is unable to extend to the outboard chordwise rib (not shown) and so cannot be supported by this existing chordwise rib, as described above.

Extending a joggle along only the spanwise edge 25a of the cover panel 25, such that it terminates adjacent the chordwise edge 25b of the cover panel 25, would be difficult to manufacture and even then provides a stress concentration area that would require reinforcement with, e.g. an additional chordwise rib or the use a butt-joint reinforcement. However, both of these options would add weight and/or complexity to the design.

One option is to provide a joggle that extends along the chordwise edge 25b as well as the spanwise edge 25a. With this arrangement, the trailing edge access panel 24 is supported along two edges. However, forming a joggle that extends around a corner between the spanwise edge 25a and chordwise edge 25b provides manufacturing challenges. Even if a joggle were to extend along both edges 25a, 25b, difficulties would arise if the joggle were extended along the entire length of the chordwise edge 25b of the single-piece cover panel 25 to the trailing edge 12a as the thickness of the panel 25 at the trailing edge 12a of the wing tip device 10 would be very large and contrary to that desired.

Figure 6:
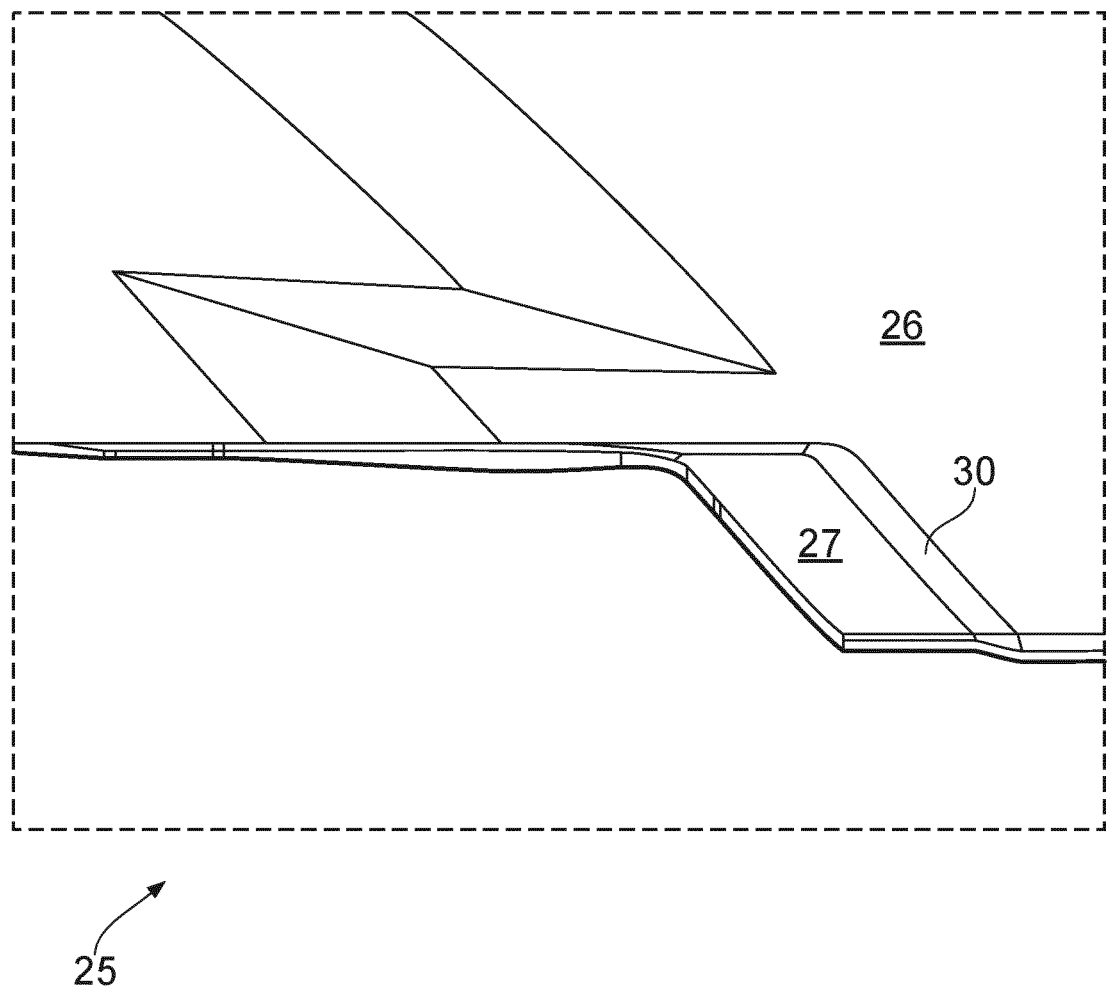
FIG. 6 shows a perspective view of the single-piece cover panel.

FIG. 6 shows the single-piece cover panel 25, wherein the thickness of the cover panel 25 varies to form a ramp 30. The cover panel 25 is a carbon fibre composite cover panel 25, such that the change in thickness that forms the ramp 30 between the upper and lower regions 26, 27 can be formed by ply-drops. Ply-drops are terminations in a composite ply.

Figure 7:
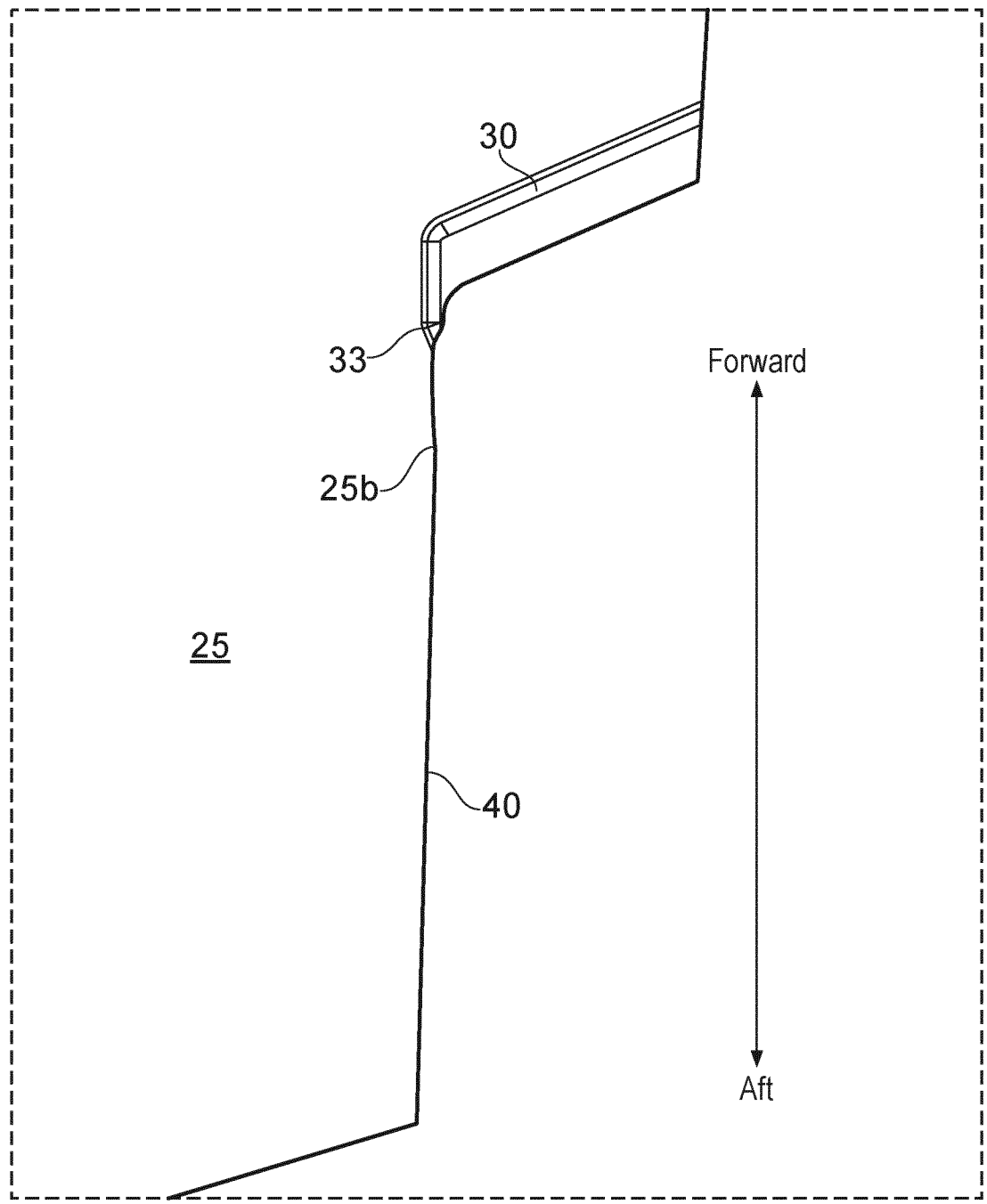
FIG. 7 shows a plan view of the single-piece cover panel.

As shown in FIG. 7, the ramp 30 extends along the spanwise edge 25a and along a portion of the chordwise edge 25b. The remaining portion of the chordwise edge 25b is a free-edge 40 of the cover panel 25. A forward portion of the chordwise edge 25b is adjacent the ramp 30, whilst an aft portion of the chordwise edge 25b (that extends to the trailing edge 12a of the wing tip device 10) forms a free-edge 40. This arrangement is particularly advantageous when there is a desire to minimise the thickness of the wing tip trailing edge 12a, as the thickness requirement to accommodate a joggle or ramp arrangement is avoided at the trailing edge 12a which would otherwise increase the thickness of the cover panel 25 at this location.

In order to smooth the transition between the ramp 30 and the free-edge, the ramp 30 includes a transition region 33, discussed below.

This transition minimises stress concentrations due to the smooth transition from the ramp 30 to the free-edge 40, whilst also minimising the thickness of the cover panel 25 at the trailing edge 12a of the wing tip device 10. This arrangement also minimises aerodynamic gaps and holes that might otherwise need to be formed when incorporating both a ramp 30 and a butt-joint along an edge of the trailing edge access panel 24.

Figure 8:
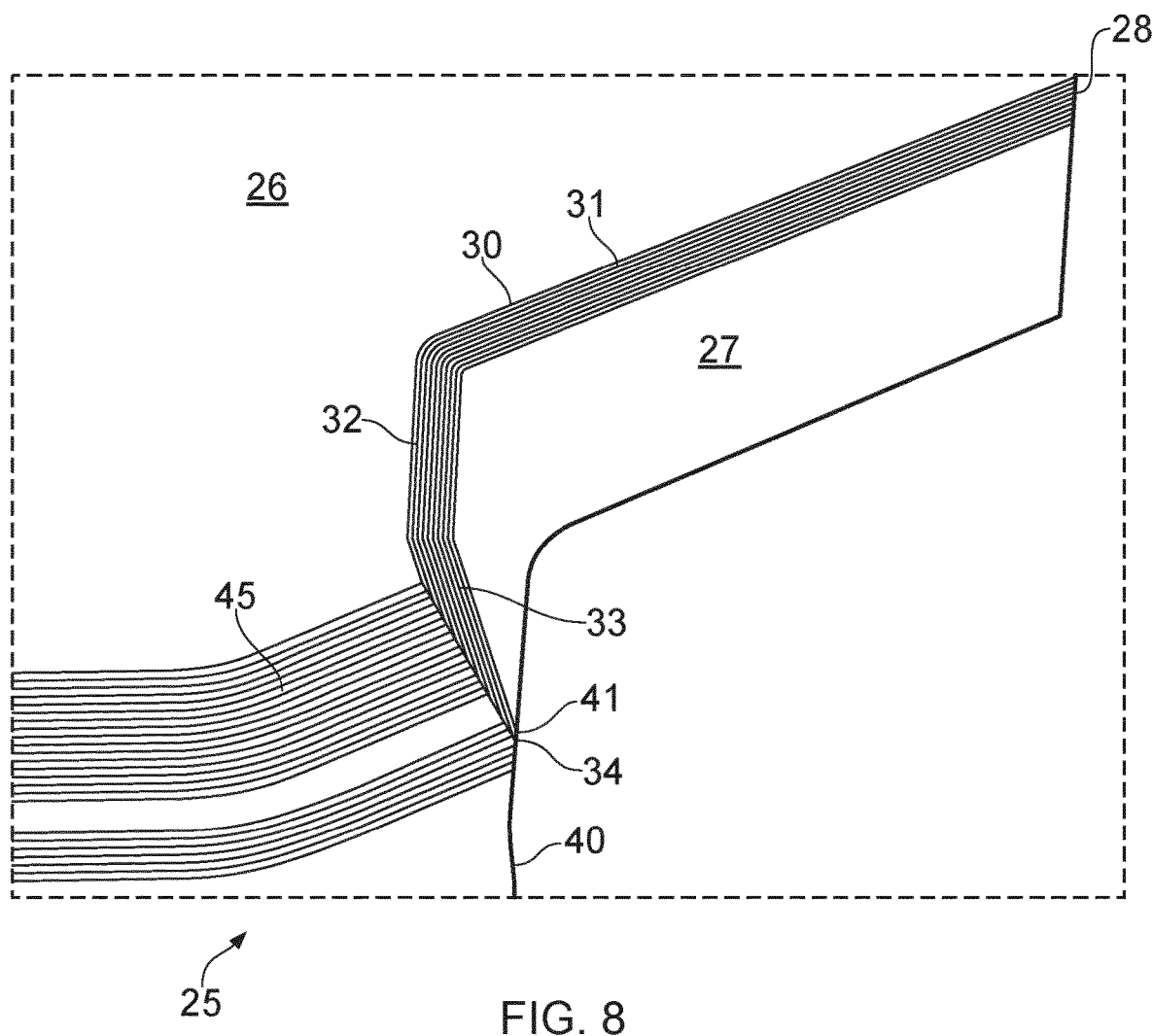
FIG. 8 shows a detailed view of the transition from a ramp to a free-edge.

FIG. 8 shows a section of the single-piece cover panel 25, in particular showing the transition region 33. The single-piece cover panel 25 includes a first region 26 and a second region 27 separated by a ramp 30, such that the first region 26 is an upper region relative to the second region 27.

The ramp 30 includes a spanwise portion 31 extending in a generally spanwise direction from an inboard edge 28 of the cover panel 25, and a chordwise portion 32 extending in a generally chordwise direction from the spanwise portion 31. The spanwise portion 31 and the chordwise portion 32 of the ramp 30 form an L-shaped section of ramp 30 with a substantially constant width.

Reference to a width of the ramp 30 refers to the distance of separation formed by the ramp 30, e.g. the shortest distance between the first region 26 and second region 27 when traversing the ramp 30. The direction in which the ramp 30 extends refers to a direction orthogonal to the width of the ramp 30 and parallel to the outer surface of the panel.

A transition portion 33 extends inboard from the chordwise portion 32 at an oblique angle to both the spanwise and chordwise portions 31, 32. The transition portion 33 extends at an acute angle, i.e. an angle between 0 degrees and 90 degrees, to the chordwise portion 32. The acute angle is preferably between 30 degrees and 60 degrees.

The transition portion 33 is a tapered region in which the width of the ramp 30 decreases towards the trailing edge 12a of the wing tip device 10. The transition region 33 tapers to a transition point 34 at which the ramp 30 ends (i.e. the width of the ramp 30 is zero) and a free-edge 40 of the single-piece panel 25 is formed.

As the second region 27 does not extend adjacent to the ramp 30 along its entire length, the transition region 33 of the ramp 30 includes a free-edge 41 between the second region 27 and the free-edge 40 of the first region 26. In alternative examples, the second region 27 may extend adjacent substantially all of the ramp 30 such that the ramp 30 does not have a free-edge 41.

Adjacent to the transition portion 33 are a series of ply-drops 45 that are indicative of a decrease in the thickness of the cover panel 25 towards the trailing edge 12a of the wing tip device 10. With this arrangement, the thickness of the first region 21a of the cover panel 25 is reduced concurrently with the transition from the ramp 30 to the free-edge 40, thereby reducing the height of the ramp 30 at the transition portion 33. This reduces stress concentrations that might otherwise build up if the height of the ramp 30 in the transition portion 33 were larger.

Figure 9:
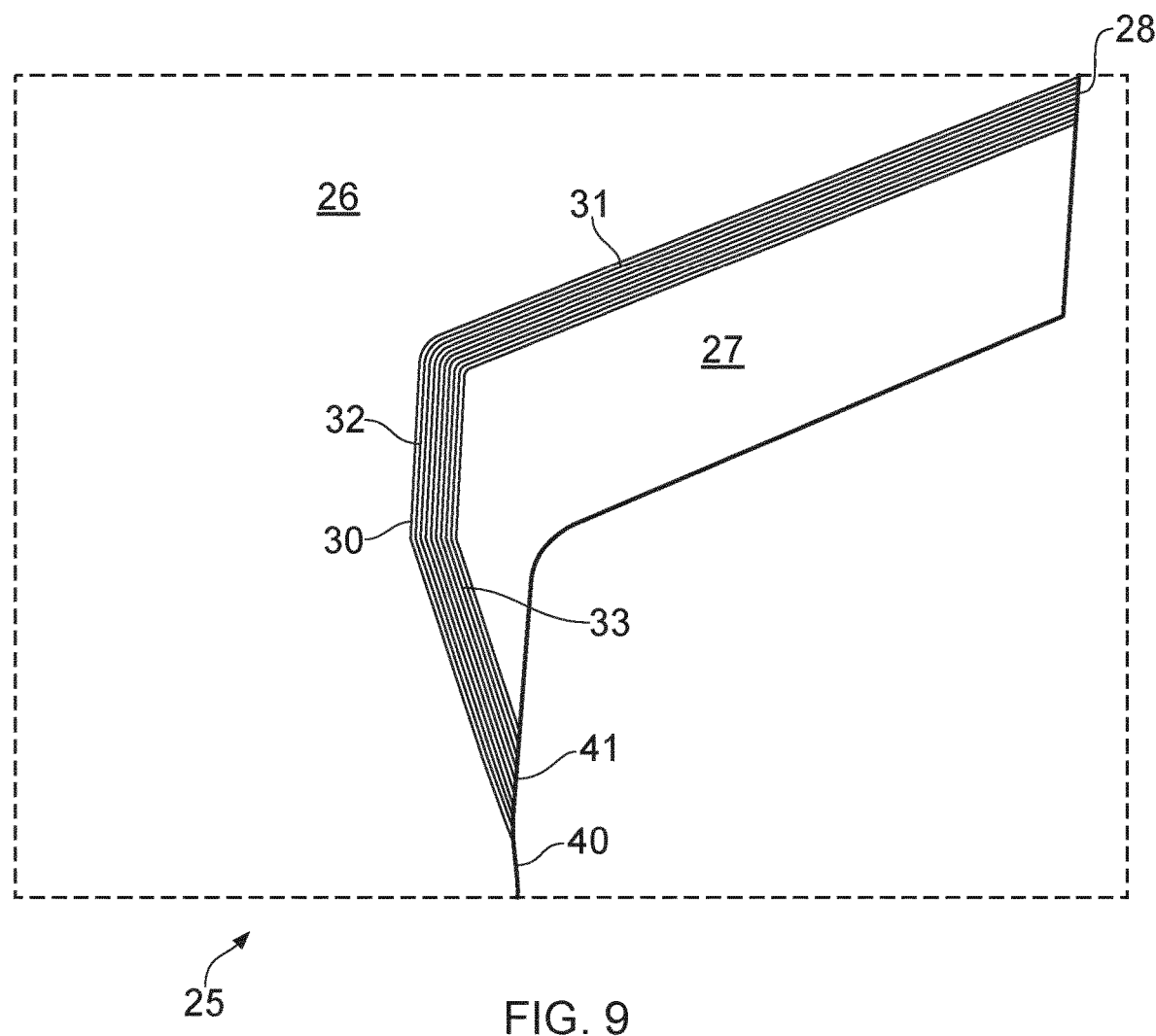
FIG. 9 shows a detailed view of the transition from a ramp to a free-edge according to an alternative example.

FIG. 9 shows an example in which the upper region 26 of the panel 25 does not include ply-drops 45. In this example, due the lack of ply-drops and the subsequent increased thickness of the upper region 26 of the panel 25 adjacent the transition region 33, the free-edge 41 of the ramp 30 is larger than the free-edge 41 shown in the example of FIG. 8.

Note that reference to a width of the ramp 30 along the portion of the transition region 33 with the free-edge 41 refers to the shortest distance between the first region 26 and the free-edge of the 41 of the ramp 30.

In alternative examples, the cover panel 25 may include ply-drops positioned at a different location away from the transition portion 33.

Figure 10:
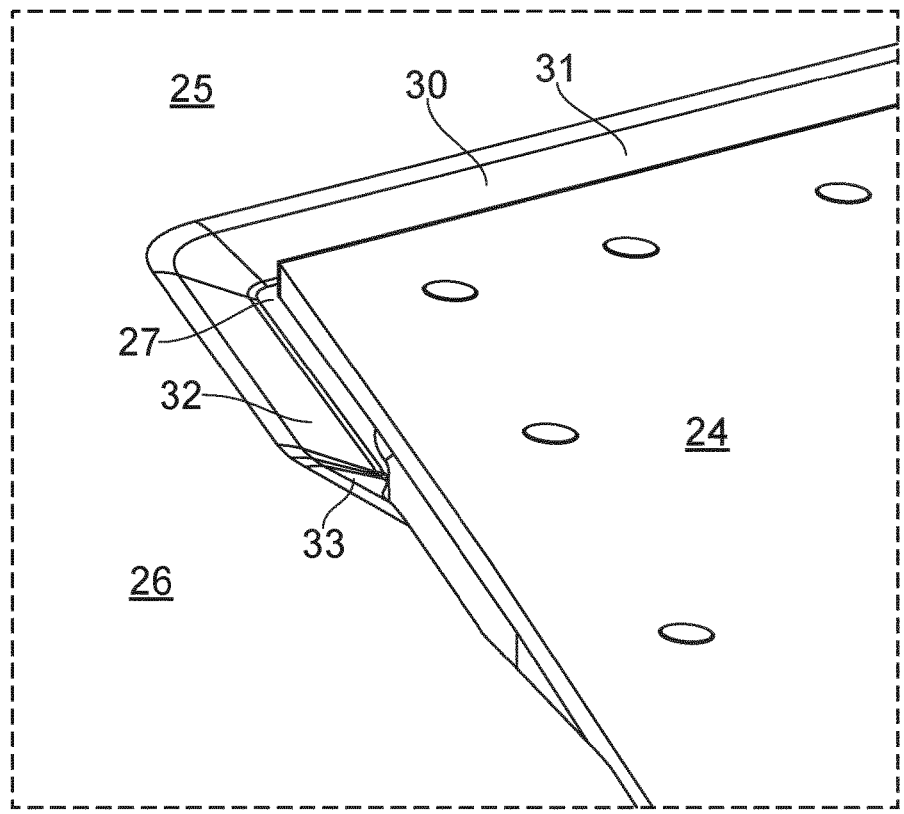
FIG. 10 shows the trailing edge access panel overlapping a second (lower) region of the cover panel.
Figure 11:
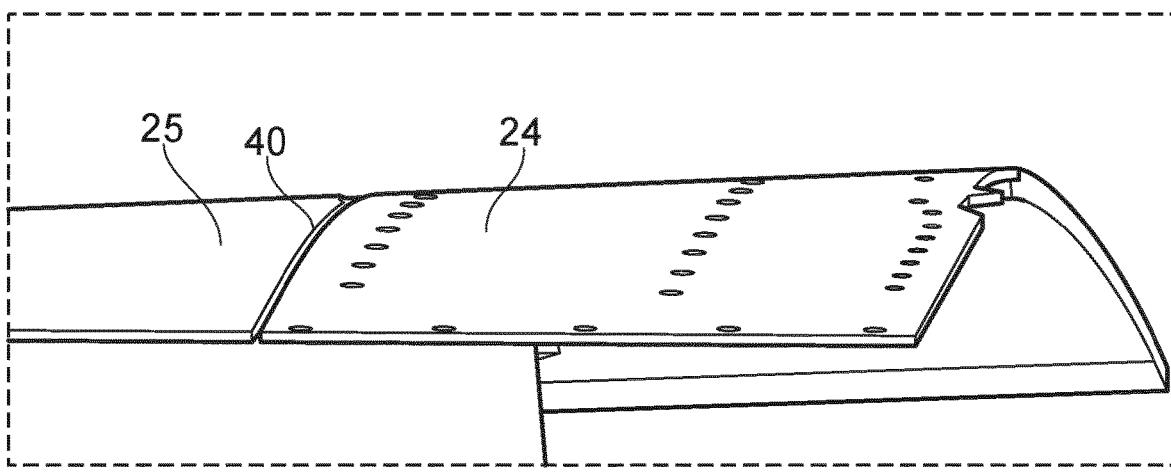
FIG. 11 shows a butt-joint between the cover panel and the trailing edge access panel.

The cover panel 25 arrangement allows a portion of the ramp 30 to extend along the chordwise edge 25b of the cover panel 25b, such that the second region 27 of the cover panel 25 is supported along two orthogonal edges, i.e. by the spanwise and chordwise portions 31, 32 of the ramp 30 as shown in FIG. 10. Furthermore, the arrangement also provides a butt-joint that is able to extend to the trailing edge 12a of the wing tip device 10, the butt-joint formed between an aft portion of the trailing edge access panel 24 and the free-edge 40 of the single-piece cover panel 25, as shown in FIG. 11.

Any remaining gaps or dips in the outer aerodynamic surface can then be filled with aero-filler, or other techniques to smooth the aerodynamic surface post installation.

Forming the transition portion 33 between the main portions 31, 32 of the ramp 30 and the free-edge 40 is challenging, particularly if the single-piece cover panel 25 is formed of composite ply layers, as in the present case. Composite materials, particularly fibre-reinforced composite materials, are typically difficult to mould and form into complex geometries, whilst free-edges are difficult to form to high tolerances. As a result, the cover panel 25 is initially formed with a ramp 30 extending up to the trailing edge 12a, as shown in FIG. 12A, and then subsequently cut post-moulding.

Figure 12A:
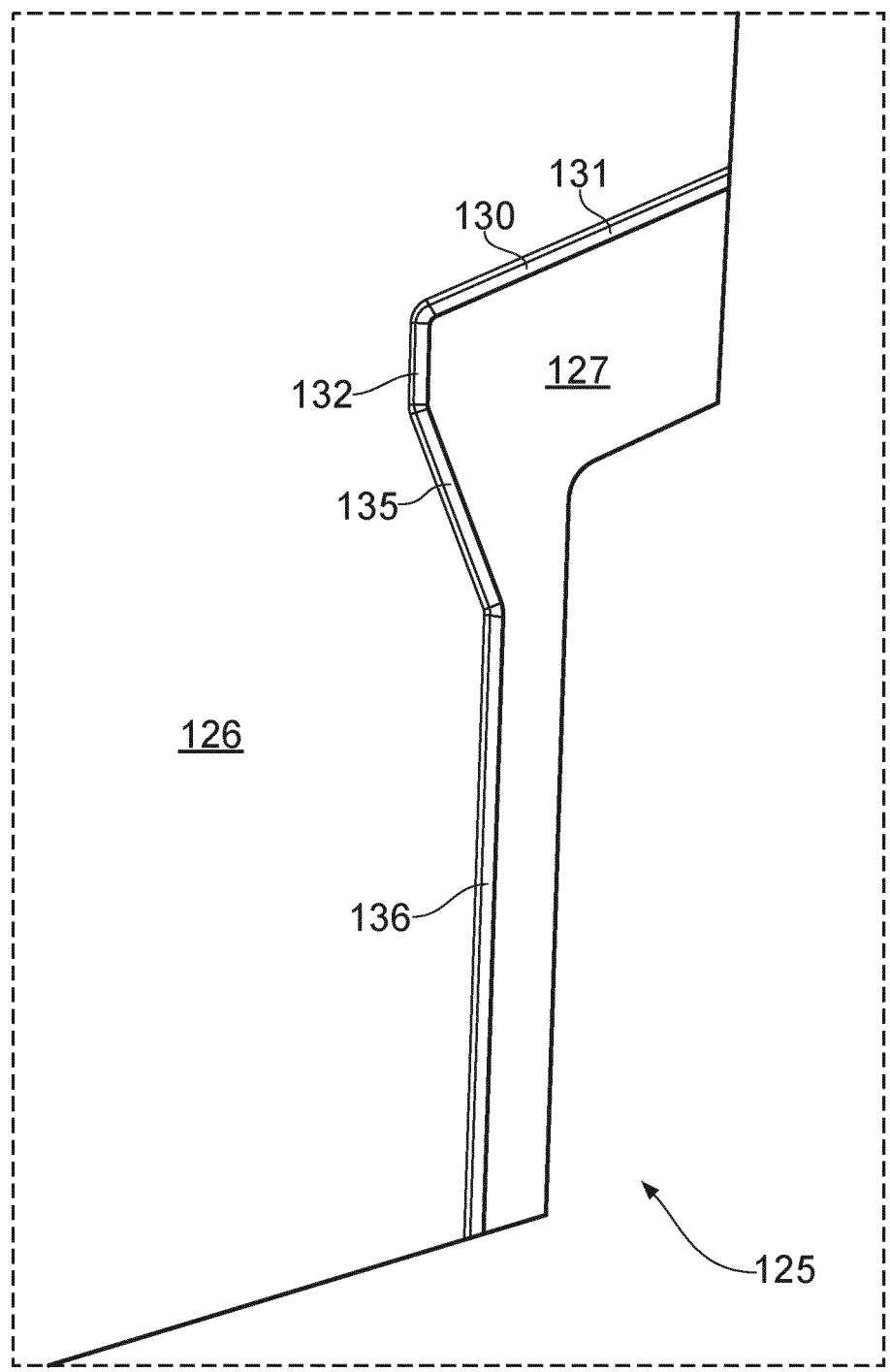
FIGS. 12A and 12B show an example of a pre-cut cover panel.
Figure 12B:
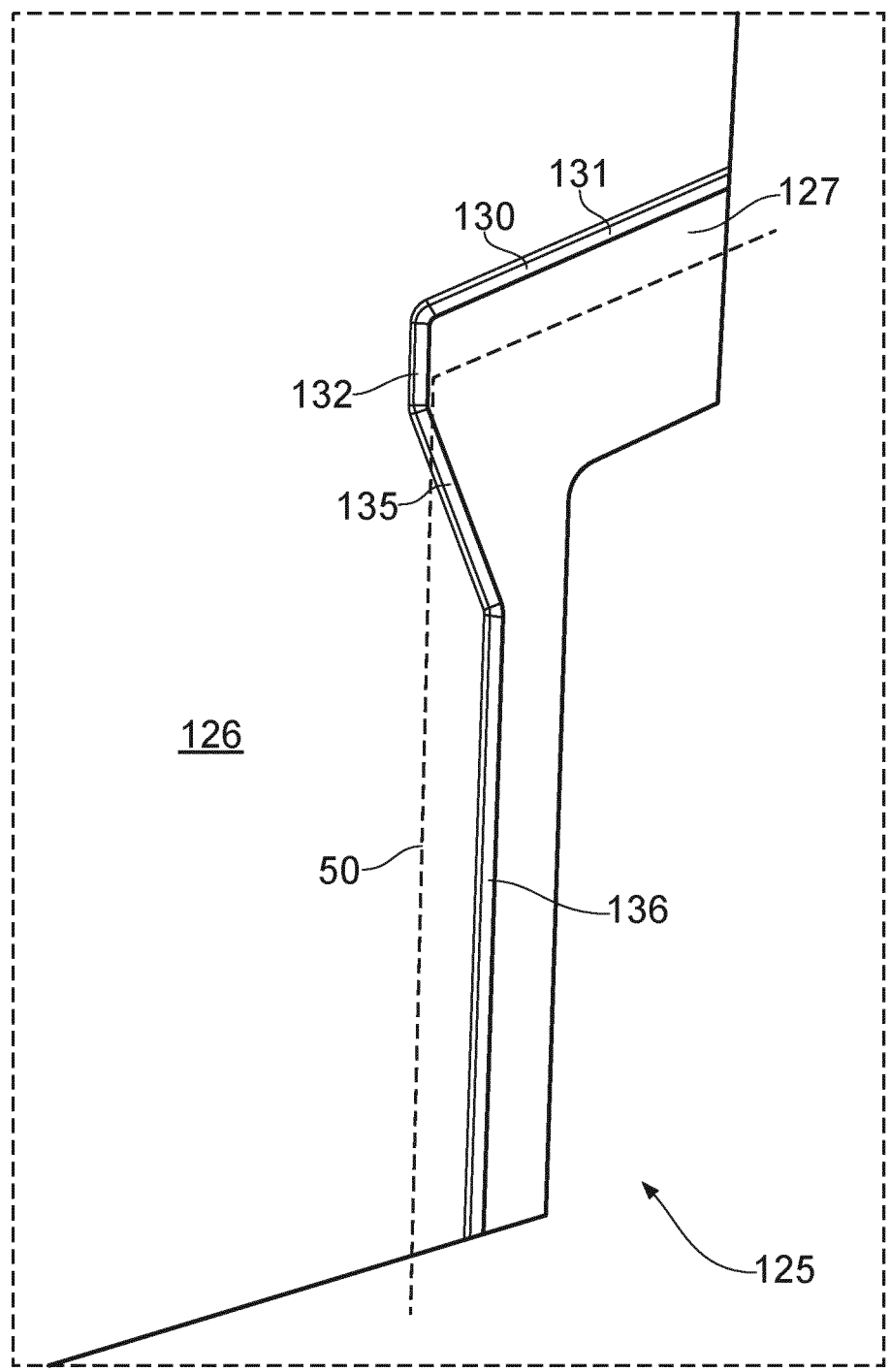

FIGS. 12A and 12B show a pre-cut state of the single-piece cover panel in which similar reference numerals but numbered in the 100 series are used to denote similar parts with the post-cut single-piece cover panel described above in relation to FIGS. 5 to 10.

The pre-cut cover panel 125, prior to the post-moulding cut, is shown in FIG. 12A. The ramp 130 includes a spanwise portion 131 and a chordwise portion 132, as described previously. In addition, the ramp 130 includes an angled portion 135 that extends inboard at an oblique angle to both the spanwise and chordwise portions 131, 132. A second chordwise portion 136 extends from the angled portion 135 to a trailing edge of the panel 125. The width of the ramp 130 is substantially constant along its entire length.

The cover panel 125 is cut along the dotted line 50 indicated in FIG. 12B, cutting through the first and second regions 126, 127 of the panel 125 and across the angled portion 135 of the ramp 130. The cover panel 125 is cut in the thickness direction of the cover panel 125, orthogonal to the surface of the panel 125, such that the cut through the first region 126 forms a free-edge 40 suitable for forming a butt-joint with an adjacent panel (as described in relation to FIGS. 5 to 10).

The cut extends through the angled portion 135 of the ramp 130 at an oblique angle to the direction in which the angled portion 135 extends. By cutting through the angled portion 135 at an oblique angle the width of the angled portion becomes tapered so as to provide a transition from the ramp 130 to the free-edge of the first region 126 (e.g. the transition portion 33 shown in FIG. 7).

The ramp 130 is therefore initially formed with an intentional 'kink', namely the angled portion 135, with the intention that this angled portion 35 is subsequently cut across at an oblique angle to form the transition region 33 and thereby smooth the transition into the free-edge 40 (as shown in the examples of FIG. 8 and FIG. 9).

With this arrangement, a transition between a ramp and a butt-joint can be formed more easily and without developing gaps or significant stress concentrations that might otherwise arise. The transition region is a smooth transition formed between the ramp and butt-joint, such that the trailing edge access panel 24 can overlap the second region 27 of the cover panel 25 formed by the ramp 30 at a first location and abut the cover panel 25 at a second region.

If the transition region 33 were omitted, there would inevitably be a gap between the cover panel 25 and the trailing edge access panel 24, rather than a butt-joint, due to the space required by the ramp 30 forward of this gap. The ramp would also terminate more suddenly, consequently increasing stress concentrations.

It will be clear to the skilled person that the examples described above may be adjusted in various ways.

The invention is described in the context of a trailing edge access panel attached to the ramp of a single-piece cover panel on an aircraft wing tip device. It will be clear to the skilled person that the invention is not limited to this particular application, and may be applicable to a number of other panel assemblies on an aircraft or in other industries such as the automotive industry. The invention may be applicable to any application in which there is a need to smoothly transition from a ramp to a butt-joint.

The invention is particularly applicable to composite materials, such as carbon fibre-reinforced composites, although the invention is also applicable to other materials such as metal and plastic.

The post-cut panel 25 is shown to have a ramp 30 with a spanwise portion 31, a chordwise portion 32, and a transition portion 33. In alternative examples, the ramp 30 may have only one of the spanwise or chordwise portions 31, 32 with the transition portion 33 extending at an oblique angle from that respective spanwise or chordwise portion 31, 32.

The ramp is said to be formed be a change in thickness of the panel. In alternative examples, corresponding ramps may be formed on each side of the panel such that the panel has a substantially constant thickness across the ramp.

The pre-cut panel 125, as shown in FIGS. 12A and 12B, includes a second chordwise portion 136 of the ramp 130 that extends to a trailing edge of the panel 125. In alternative examples, the ramp 130 may extend up a different edge of the panel 125 other than the trailing edge. In further alternative examples, the pre-manufactured panel may not include a second chordwise portion 136 and instead the angled portion 135 may extend straight and up to an edge of the panel 125.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A cover panel for an aircraft comprising:
   a first region with a first external aerodynamic surface of the aircraft,
   a second region configured to underlie a portion of a second panel, wherein the second panel includes a second external aerodynamic surface of the aircraft adjacent the first external aerodynamic surface, and
   a ramp spanning a gap between the first and second external aerodynamic surfaces, wherein the gap is parallel to the first and second external aerodynamic surfaces,
   wherein at least a portion of the ramp is between the first region and the second region,
   wherein a thickness of the cover panel varies to form the portion of the ramp between the first region towards the second region, wherein the ramp includes a tapered region such that a width of the ramp tapers towards a free-edge of the first region, and
   wherein the free-edge forms a butt-joint with the second panel.

2. The cover panel according to claim 1, wherein the tapered region extends in a direction angled with respect to a portion of the ramp adjacent to the tapered region.

3. The cover panel according to claim 1, wherein a thickness of the first region is greater than a thickness of the second region.

4. The cover panel according to claim 1, wherein a side of the cover panel is substantially planar.

5. The cover panel according to claim 1, wherein the cover panel comprises a carbon fiber reinforced polymer composite material.

6. The cover panel according to claim 5, wherein the ramp includes one or more ply drops.

7. The cover panel according to claim 5, wherein the cover panel is a laminate comprising:
   a plurality of dropped plies across the first region, and
   a location of the dropped plies coincides with the tapered region such that a height of the tapered region decreases towards the free-edge.

8. A cover panel for an aircraft, comprising:
   a first region including a first external aerodynamic surface of the aircraft, a second region configured to underline a portion of the second panel, wherein the second panel include a second external aerodynamic surface of the aircraft adjacent the first external aerodynamic surface, and a ramp spanning a gap between the first and second external aerodynamic surfaces, wherein the gap is parallel to the first and second external aerodynamic surfaces, wherein at least a portion of the ramp is between the first region and the second region, wherein the ramp includes a tapered region such that a width of the ramp tapers towards a free-edge of the first region, wherein the free-edge forms a butt-joint with the second panel, and wherein the ramp includes a first portion and a second portion each between the first region and the second region, the first portion of the ramp extends in a direction angled with respect to the second portion.

9. The cover panel according to claim 8, wherein the first portion extends in a direction substantially perpendicular to the second portion.

10. An assembly comprising:
a cover panel comprising a first region, a second region, a ramp, wherein the first region includes a first external aerodynamic surface of the aircraft, and
a second panel including a second external aerodynamic surface of the aircraft,
wherein the second region underlies a portion of the second panel;
wherein at least a portion of the ramp is between the first region and the second region,
wherein the ramp spans a gap between and parallel to the first and second external aerodynamic surfaces,
wherein the ramp includes a tapered region such that a width of the ramp tapers towards a free-edge of the first region, and wherein the free-edge forms a butt-joint with the second panel, and wherein a thickness of the cover panel varies to form the portion of the ramp between the first region towards the second region, and wherein the second panel forms an overlap with the second region of the cover panel.

11. The assembly according to claim 10, wherein the second panel has a substantially straight edge that extends across a portion of the second region and abuts the free-edge of the first region.

12. The assembly according to claim 10, wherein the cover panel is an aircraft wing tip cover panel and the second panel is a removable aircraft wing tip cover panel.

13. The assembly according to claim 12, wherein at least a portion of the ramp and the free-edge extend in a generally chordwise direction.

14. The assembly according to claim 10, wherein the free-edge is aft of the ramp and is configured to extend towards a trailing edge of a wing tip device.

15. The cover panel according to claim 8, wherein the first portion of the ramp extends in a generally chordwise direction and the second portion of the ramp extends in a generally spanwise direction.

16. The assembly according to claim 15 wherein the second portion of the ramp extends inboard towards an inboard end of a wing tip device.

17. An aircraft wing tip device comprising the cover panel of claim 1.

* * * * *